(12) United States Patent
Sakakibara

(10) Patent No.: US 8,757,230 B2
(45) Date of Patent: Jun. 24, 2014

(54) ANTI-SKID DEVICE FOR TIRES

(76) Inventor: Kouichi Sakakibara, Hashima (JP)

( * ) Notice: Subject to any disclaimer, the term of this patent is extended or adjusted under 35 U.S.C. 154(b) by 0 days.

(21) Appl. No.: 13/876,122

(22) PCT Filed: Sep. 27, 2011

(86) PCT No.: PCT/JP2011/071973
§ 371 (c)(1),
(2), (4) Date: Mar. 26, 2013

(87) PCT Pub. No.: WO2012/147220
PCT Pub. Date: Nov. 1, 2012

(65) Prior Publication Data
US 2013/0180640 A1  Jul. 18, 2013

(30) Foreign Application Priority Data
Apr. 26, 2011 (JP) .................. 2011-098295

(51) Int. Cl.
B60C 27/00 (2006.01)
(52) U.S. Cl.
USPC .................. 152/225 C; 152/227; 152/239
(58) Field of Classification Search
USPC ...... 152/213 R, 216, 213 A, 219, 223, 225 R, 152/226–227, 225 C, 239–242
See application file for complete search history.

(56) References Cited

U.S. PATENT DOCUMENTS 1,020,489 A * 3/1912 Gaylor ..................... 152/225 R
2,448,730 A * 9/1948 Paraskevas ................ 152/237

(Continued)

FOREIGN PATENT DOCUMENTS

JP  A-48-104205   12/1973
JP  U-52-102606    8/1977

(Continued)

OTHER PUBLICATIONS

Jan. 10, 2012 International Search Report issued in International Application No. PCT/JP2011/071973.

Primary Examiner — Jason Bellinger
(74) Attorney, Agent, or Firm — Oliff PLC

(57) ABSTRACT

In an anti-skid device of fit-in type, less time and effort are needed for adjusting the inner width of anti-skid bodies. The anti-skid device is such that two or more anti-skid bodies having a U-shaped cross-section are fitted therein with a tire of a car and arranged in circumferential direction of the tire so as to be connected with one another. An exterior part of each anti-skid body is provided with a contact member for contacting with an outside surface of the tire, while an interior part is provided with a contact member for contacting with an inside surface of the tire. The exterior part or the interior part of each anti-skid body is attached thereto with a shaft 7 along an axial direction of the tire T. The shaft can move forward and backward in the axial direction of the tire. The contact member 6 is provided at an inner end of the shaft. An elastic member 9 is provided to apply a forward movement force to the shaft attached thereto with the contact member. The contact member is pressed against the outside surface or the inside surface of the tire by an elastic force of the elastic member. The contact member moves forward by the elastic force of the elastic member when the outside surface or the inside surface of the tire moves to opposite side to the contact member. The contact member moves backward against the elastic force of the elastic member when the outside surface or the inside surface of the tire moves to the contact member side.

5 Claims, 8 Drawing Sheets

(56) References Cited

U.S. PATENT DOCUMENTS

| | | | | |
|---|---|---|---|---|
| 2,453,611 A | * | 11/1948 | Zimmer | 152/225 R |
| 4,960,159 A | | 10/1990 | Oda | |
| 2003/0084976 A1 | | 5/2003 | Sakakibara | |
| 2005/0146205 A1 | | 7/2005 | Sakakibara | |
| 2007/0131325 A1 | | 6/2007 | Sakakibara | |
| 2012/0279625 A1 | | 11/2012 | Sakakibara | |

FOREIGN PATENT DOCUMENTS

| | | |
|---|---|---|
| JP | A-2000-289419 | 10/2000 |
| JP | A-2003-89307 | 3/2003 |
| JP | A-2003-252016 | 9/2003 |
| JP | A-2005-126069 | 5/2005 |
| JP | A-2007-290627 | 11/2007 |
| JP | A-2008-013051 | 1/2008 |
| JP | A-2008-110680 | 5/2008 |
| JP | A-2008-120226 | 5/2008 |
| JP | A-2008-137394 | 6/2008 |
| JP | A-2008-273455 | 11/2008 |
| JP | A-2008-308149 | 12/2008 |
| JP | A-2009-045973 | 3/2009 |
| JP | A-2009-120050 | 6/2009 |
| JP | A-2011-011671 | 1/2011 |
| JP | A-2011-063164 | 3/2011 |
| JP | A-2011-168233 | 9/2011 |
| JP | A-2011-189773 | 9/2011 |
| JP | A-2012-016963 | 1/2012 |
| JP | A-2012-040884 | 3/2012 |
| JP | A-2012-192883 | 10/2012 |
| JP | A-2012-218572 | 11/2012 |
| JP | A-2012-224259 | 11/2012 |

* cited by examiner

ANTI-SKID DEVICE FOR TIRES

TECHNICAL FIELD

The present invention relates to an anti-skid device to be attached to a tire for cars.

BACKGROUND ART

Patent literature exemplifies an anti-skid device for tires in which anti-skid bodies having U-shaped cross-sections are fitted therein with a tire of a car. That is so-called fit-in type. Two or more anti-skid bodies are arranged in the circumferential direction of the tire so as to be connected with one another. The two or more anti-skid bodies are attached to the tire in a circular fashion. When the anti-skid device is detached from the tire, the anti-skid bodies are disconnected from one another thereby to be released from the tire.

Each of the anti-skid bodies having U-shaped cross-sections has a crossing part that crosses the ground contact surface of the tire, an exterior part that is along the outside surface of the tire, and an interior part that is along the inside surface of the tire.

The exterior part of the anti-skid bodies is provided with a contact member that contacts with the outside surface of the tire. The interior part of the anti-skid bodies is provided with a contact member that contacts with the inside surface of the tire. The contact members are configured capable of changing their positions in the width direction of the anti-skid bodies and in the axial direction of the tire. The anti-skid bodies are configured capable of increasing and decreasing the distance in the width direction of the anti-skid bodies between the exterior-side contact member and the interior-side contact member, i.e. the inner width. The inner width of the anti-skid bodies is adjusted depending on the width of the tire.

SUMMARY OF INVENTION

Technical Problem

Problems

In such an anti-skid device of fit-in type, the anti-skid bodies before being used are adjusted to have an appropriate inner width depending on the width of the tire of the car. The inner width of the anti-skid bodies is maintained during the use of the anti-skid device and the driving of the car.

The tire of the car, however, deforms due to the increase and decrease of the filled air amount and the carrying weight in the car body as well as the variation in forces received while the car body is moving, and the width in the axial direction thus varies. The width of the tire also increases and decreases while the car is moving even after the anti-skid device is attached to the tire.

It is desired for the anti-skid bodies to need less time and effort for adjusting the inner width.

Original Ideas

In an anti-skid device of fit-in type, the anti-skid bodies are made such that contact members are pressed against side surfaces of the tire by means of elastic forces.

When the width of the tire decreases and the side surface of the tire contacted with the contact members moves to the opposite side to the contact members, the contact members move forward by the elastic forces. In contrast, when the width of the tire increases and the side surface of the tire contacted with the contact members moves to the contact members' side, the contact members move backward against the elastic forces. The contact members move in response to the movement of side surfaces of the tire. The contact between the contact members and the side surfaces of the tire is thus maintained.

Specifically, exterior parts or interior parts of the anti-skid bodies are attached thereto with shafts along the width direction of the anti-skid bodies. Those shafts are made to be movable forward and backward in the width direction of the anti-skid bodies and in the axial direction of the tire. The contact members are provided at inner ends of the shafts that protrude into the anti-skid bodies. Elastic members are provided to apply forward movement forces to the shafts attached thereto with the contact members.

Advantageous Effects of Invention

The anti-skid bodies are such that the inner width thereof increases and decreases in accordance with the width of the tire. The adjustment of the inner width requires less time and effort.

DESCRIPTION OF EMBODIMENTS

First Example

Refer to FIG. 1 to FIG. 9

Figure 1:
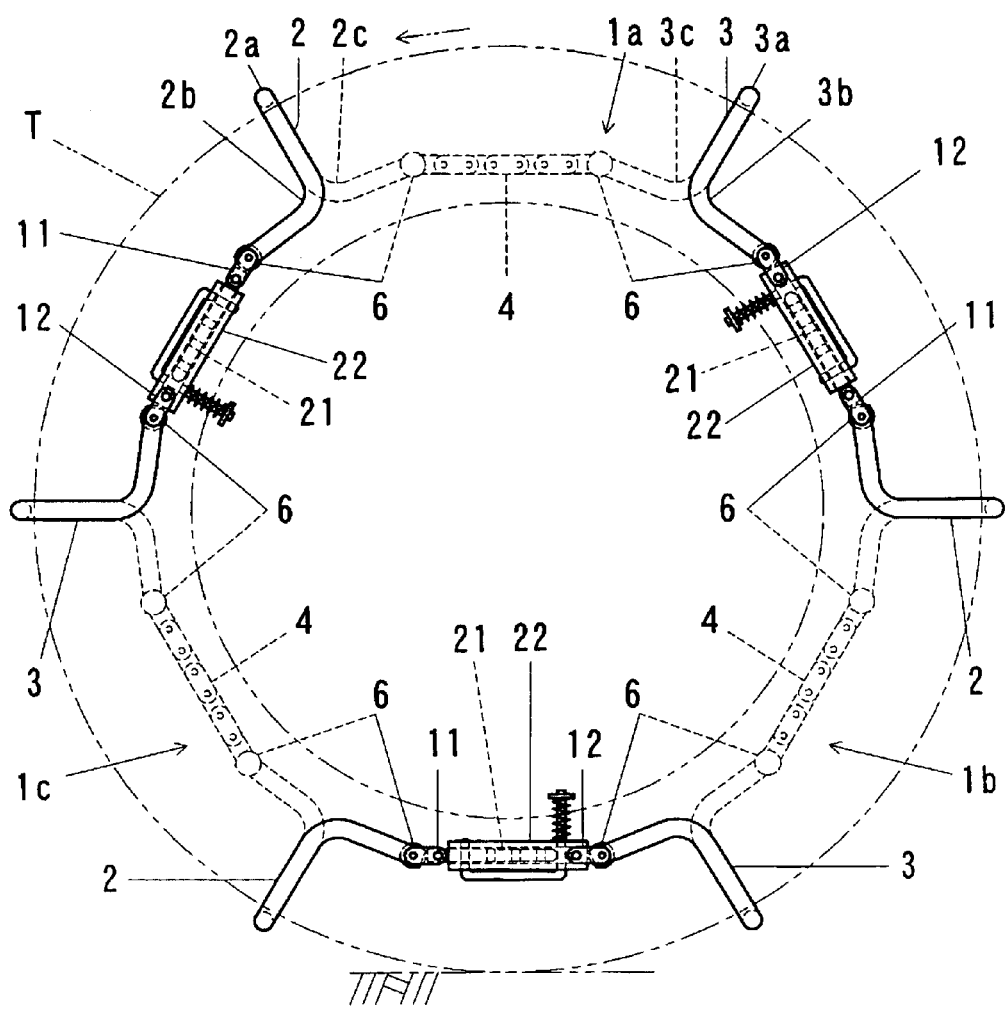
FIG. 1 is a front elevational view of a state where an anti-skid device for tires in a first example according to embodiments of the present invention is attached to a tire.

Referring to FIG. 1, a front elevational view of an anti-skid device for tires according to the present example is shown where a state that the anti-skid device is attached to a tire T of a car is viewed from the exterior of the car. Parts to be of the exterior of the car are shown by solid lines while parts to be of the interior are shown by broken lines. The anti-skid device is configured such that a first anti-skid body 1a, a second anti-skid body 1b, and a third anti-skid body 1c (individually denoted herein, and collectively anti-skid body or bodies 1) are arranged to be connected with one another in a circumference direction of the tire T at regular intervals in this order from the front side in the positive rotation direction of the tire T as shown by an arrow in FIG. 1 when the car moves forward.

Three anti-skid bodies 1a, 1b, and 1c are made as the same structure. Accordingly, the first anti-skid body 1a will representatively be described. The first anti-skid body 1, 1a comprises a front-side U-shaped member 2, a rear-side U-shaped member 3, and an interior-side linear-shaped member 4.

Figure 2:
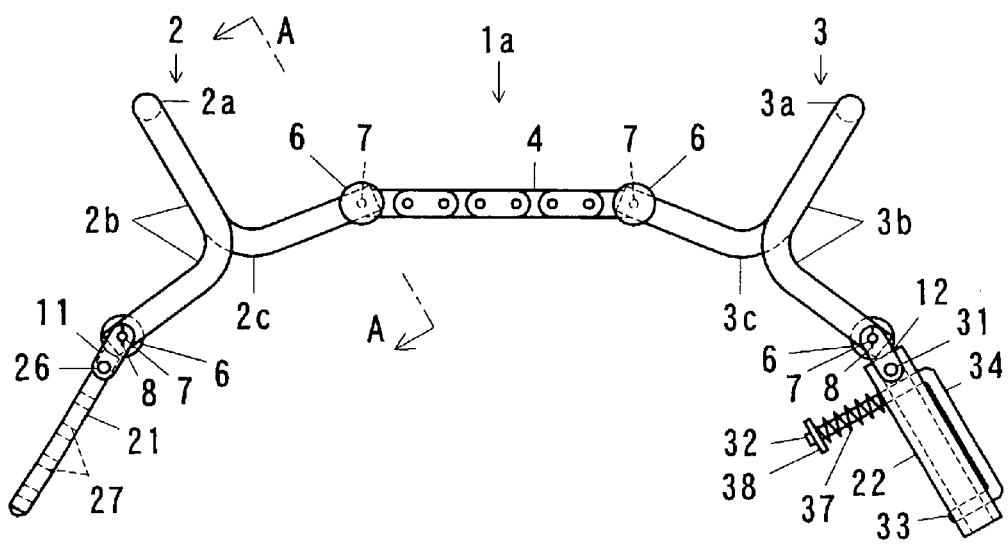
FIG. 2 is an enlarged front elevational view of a first anti-skid body shown in FIG. 1.
Figure 3:
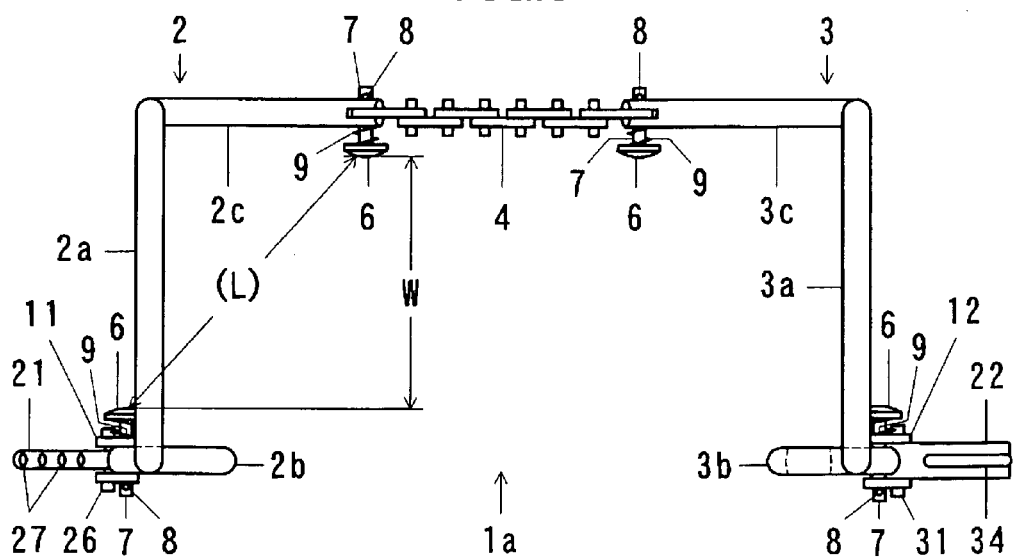
FIG. 3 is an enlarged plan view of the first anti-skid body.

As shown in FIG. 1 to FIG. 3, the front-side and the rear-side U-shaped members 2 and 3 are formed in a spatially symmetrical structure in which round rods are curved into U shapes for being fitted therein with the outer circumference side of the tire T. The U-shaped members 2 and 3 have crossing parts 2a and 3a that cross the tread area (ground contact area) of the tire T, exterior parts 2b and 3b that are along the outside surface of the tire T, and interior parts 2c and 3c that are along the inside surface of the tire T. The front-side and the rear-side U-shaped members 2 and 3 are to be fitted therein with the tire T to make a center angle of about 60 degrees.

The front-side U-shaped member 2 is configured such that the exterior part 2b is mainly located along the radial direction of the tire T and an end portion of the exterior part 2b is bent and extends toward the front-side. The front-side extending portion of the exterior part 2b is located along the circumferential direction of the tire T. The front-side U-shaped member 2 is further configured such that the interior part 2c is mainly located along the radial direction of the tire T and an end portion of the interior part 2c is bent and extends toward the rear-side. The rear-side extending portion of the interior part 2c is located along the circumferential direction of the tire T.

The rear-side U-shaped member 3 is configured such that the exterior part 3b is mainly located along the radial direction of the tire T and an end portion of the exterior part 3b is bent and extends toward the rear-side. The rear-side extending portion of the exterior part 3b is located along the circumferential direction of the tire T. The rear-side U-shaped member 3 is further configured such that the interior part 3c is mainly located along the radial direction of the tire T and an end portion of the interior part 3c is bent and extends toward the front-side. The front-side extending portion of the interior part 3c is located along the circumferential direction of the tire T.

Figure 4:
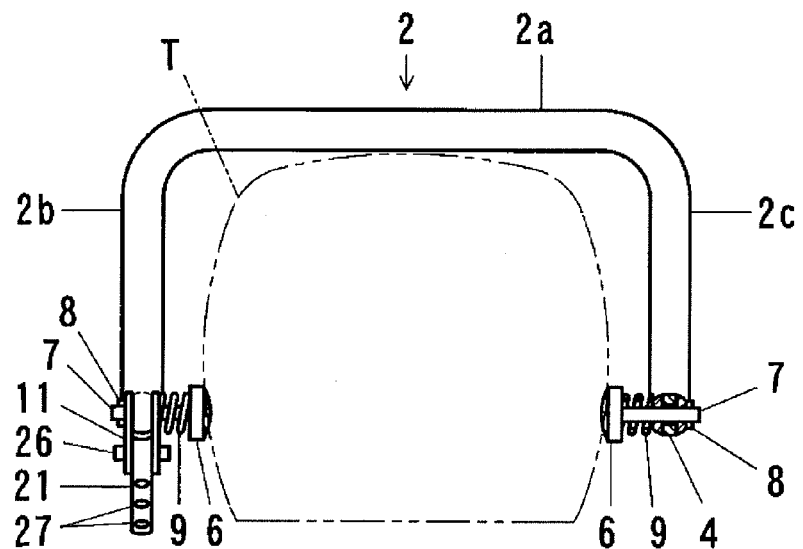
FIG. 4 is an enlarged cross-sectional view along line A-A in FIG. 2.

The interior-side linear-shaped member 4 is provided as a chain. This chain 4 comprises plural plate-like links that are connected with one another by pins into a string-shape so as to be pivotally movable relative to one another. Thus, the interior-side linear-shaped member 4 is provided as a leaf chain. As shown in FIG. 3 and FIG. 4, the leading end of the interior-side linear-shaped member 4 is attached to the trailing end of the interior part 2c of the front-side U-shaped member 2 by means of a shaft 7. The shaft 7 penetrates the leading end of the linear-shaped member 4 and the trailing end of the interior part 2c of the front-side U-shaped member 2 along the axial direction of the tire T. Like the leading end, the trailing end of the interior-side linear-shaped member 4 is also attached to the leading end of the interior part 3c of the rear-side U-shaped member 3 by means of a shaft 7. This shaft 7 penetrates the trailing end of the linear-shaped member 4 and the leading end of the interior part 3c of the rear-side U-shaped member 3 along the axial direction of the tire T.

The anti-skid body 1 is configured to have a U-shaped cross-section for being fitted therein with the tire T. The anti-skid body 1 having the U-shaped cross-section, in particular the crossing parts 2a and 3a of the front-side and the rear-side U-shaped members 2 and 3, constitute the crossing parts which cross the ground contact surface of the tire T. Further, the anti-skid body 1, in particular the exterior parts 2b and 3b of the front-side and the rear-side U-shaped members 2 and 3, constitute the exterior parts which are along the outside surface of the tire T. Furthermore, the interior parts 2c and 3c of the front-side and the rear-side U-shaped members 2 and 3 and the interior-side linear-shaped member 4 constitute the interior parts which are along the inside surface of the tire T.

Each of the front side and the rear side shafts 7 at the interior parts of the anti-skid body 1 is made capable of moving forward and backward in the width direction of the anti-skid body 1, i.e. in the axial direction of the tire T. The inner end of each shaft 7 protrudes into the anti-skid body 1 and is fixed thereto with a disc-shaped contact member 6 in a concentric fashion. The contact member 6 has a larger diameter than that of the shaft 7. The outer end of the shaft 7 protrudes from the anti-skid body 1 and is attached therethrough with a split pin 8 as a retainer. The inner end side portion of the shaft 7 is inserted into a cylindrical-shaped spiral spring 9. The spiral spring 9 is fitted between the contact member 6 and the interior part of the anti-skid body 1. This spiral spring 9 constitutes an elastic member that applies a forward movement force to the shaft 7 attached thereto with the contact member 6. The interior-side contact member 6 is configured to contact with the inside surface of the tire T by the elastic force of the elastic member 9. More in detail, the interior-side contact member 6 is configured to contact with the inner periphery of the inside surface of the tire T.

When the width of the tire T decreases and the inside surface of the tire T contacted with the interior-side contact members 6 moves to the opposite side to the interior-side contact members 6, the interior-side contact members 6 move forward by the elastic forces of the elastic members 9. In contrast, when the width of the tire T increases and the inside surface of the tire T contacted with the interior-side contact members 6 moves to the side of the interior-side contact members 6, the interior-side contact members 6 move backward against the elastic forces of the elastic members 9. The interior-side contact members 6 move in response to the movement of the inside surface of the tire T. The contact between the interior-side contact members 6 and the inside surface of the tire T is thus maintained.

The leading end of the exterior part 2b of the front-side U-shaped member 2 is attached thereto with a front-side connecting member 11 by means of a shaft 7. The shaft 7 penetrates the leading end of the exterior part 2b of the front-side U-shaped member 2 and the trailing end of the front-side connecting member 11 along the axial direction of the tire T. The trailing end of the exterior part 3b of the rear-side U-shaped member 3 is attached thereto with a rear-side connecting member 12 by means of a shaft 7. This shaft 7 penetrates the trailing end of the exterior part 3b of the rear-side U-shaped member 3 and the leading end of the rear-side connecting member 12 in the axial direction of the tire T. The front-side and the rear-side connecting members 11 and 12 are made pivotally movable around respective shafts 7. Further, the connecting members 11 and 12 are provided as plate-like links of a chain.

Each of the front side and the rear side shafts 7 at the exterior parts of the anti-skid body 1 is made capable of moving forward and backward in the width direction of the anti-skid body 1, i.e. in the axial direction of the tire T. The inner end of each shaft 7 protrudes into the anti-skid body 1 and is fixed thereto with a disc-shaped contact member 6 in a concentric fashion. The contact member 6 has a larger diameter than that of the shaft 7. The outer end of the shaft 7 protrudes from the anti-skid body 1 and is attached therethrough with a split pin 8 as a retainer. The inner end side portion of the shaft 7 is inserted into a cylindrical-shaped spiral spring 9. The spiral spring 9 is fitted between the contact member 6 and the exterior part of the anti-skid body 1. This spiral spring 9 constitutes an elastic member that applies a forward movement force to the shaft 7 attached thereto with the contact member 6. The exterior-side contact member 6 is configured to contact with the outside surface of the tire T, more in detail, with the inner periphery of the outside surface, by the elastic force of the elastic member 9.

When the width of the tire T decreases and the outside surface of the tire T contacted with the exterior-side contact members 6 moves to the opposite side to the exterior-side contact members 6, the exterior-side contact members 6 move forward by the elastic forces of the elastic members 9. In contrast, when the width of the tire T increases and the outside surface of the tire T contacted with the exterior-side contact members 6 moves to the side of the exterior-side contact members 6, the exterior-side contact members 6 move backward against the elastic forces of the elastic members 9. The exterior-side contact members 6 move in response to the movement of the outside surface of the tire T. The contact between the exterior-side contact members 6 and the outside surface of the tire T is thus maintained.

The front-side U-shaped member 2 is configured such that the exterior-side contact member 6 provided with the exterior part 2b and the interior-side contact member 6 provided with the interior part 2c are arranged at obliquely opposing positions where they are facing each other in a direction slanted from the width direction of the anti-skid body 1. The distance L between the exterior-side and the interior-side contact members 6 is longer than the inner width W of the anti-skid body 1. Front portion of the anti-skid body 1 is easy to be attached to and detached from the tire T. The rear-side U-shaped member 3 is also configured such that the exterior-side contact member 6 provided with the exterior part 3b and the interior-side contact member 6 provided with the interior part 3c are arranged at obliquely opposing positions where they are facing each other in a direction slanted from the width direction of the anti-skid body 1. The distance L between the exterior-side and the interior-side contact members 6 is longer than the inner width W of the anti-skid body 1. Rear portion of the anti-skid body 1 is also easy to be attached to and detached from the tire T.

Figure 5:
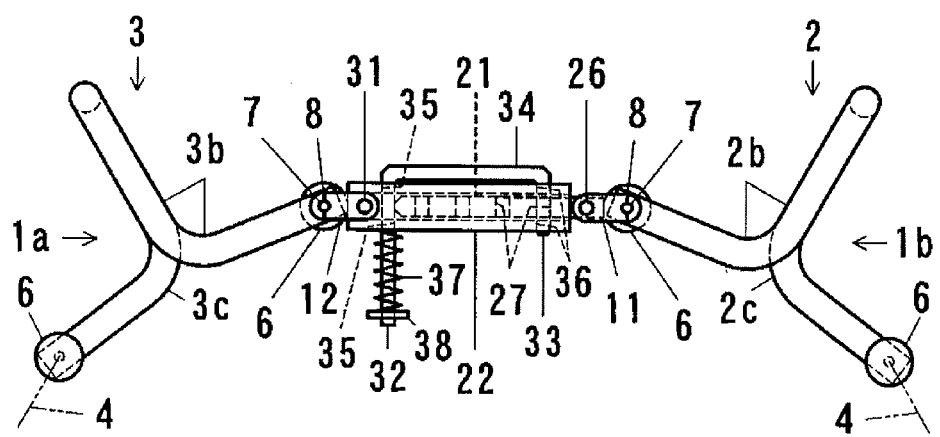
FIG. 5 is an enlarged front elevational view of a connecting portion between the first anti-skid body and a second anti-skid body shown in FIG. 1.
Figure 6:
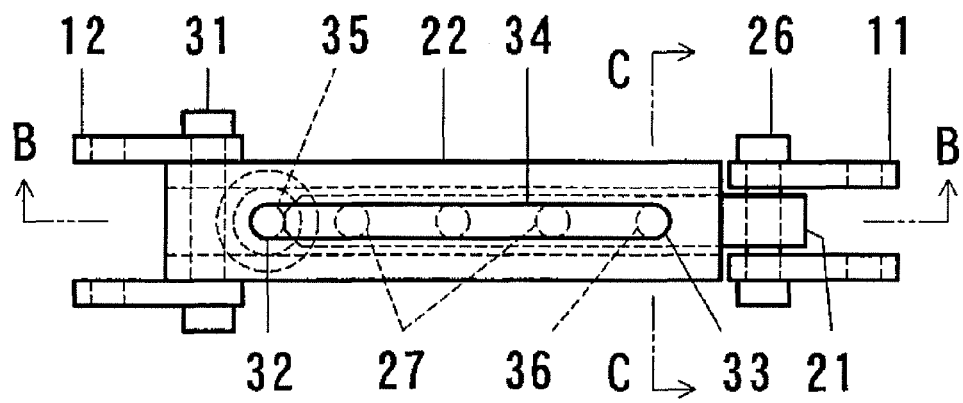
FIG. 6 is an enlarged plan view of the connecting portion.

The leading end of the front-side connecting member 11 is attached thereto with a rod-like connecting component 21. The trailing end of the rear-side connecting member 12 is attached thereto with a tube-like connecting component 22. The rod-like connecting component 21 and the tube-like connecting component 22 are configured to be connectable with and disconnectable from each other. Three pairs of connecting components 21 and 22 of the same structure are employed to connect three anti-skid bodies 1a to 1c. FIG. 5 and FIG. 6 depict a state where a connecting portion between the first anti-skid body 1a and the second anti-skid body 1b in FIG. 1 is horizontally placed.

The rod-like connecting component 21 has a round rod shape and an attaching end thereof is attached to the leading end of the front-side connecting member 11 using a pin 26. The rod-like connecting component 21 is pivotally movable around the pin 26, which is along the axial direction of the tire T. Plural connecting holes 27 are formed in the round rod shape rod-like connecting component 21 to pass therethrough in the diametrical direction. The plural connecting holes 27 are arranged with regular intervals along the longitudinal direction of the rod-like connecting component 21.

The tube-like connecting component 22 has a hollow cylindrical shape and an attaching end thereof is attached to the trailing end of the rear-side connecting member 12 using a pin 31. The tube-like connecting component 22 is pivotally movable around the pin 31, which is along the axial direction of the tire T. The tube-like connecting component 22 has a center hole into which the rod-like connecting component 21 can be inserted from an opening of the end of the center hole.

A manipulation member is attached to the tube-like connecting component 22. The manipulation member is configured such that an attaching rod 32 and a connecting rod 33 arranged in parallel with each other are connected by a manipulation rod 34, thus having a hook shape. The attaching rod 32 is longer than the connecting rod 33. A pair of attaching holes 35 and a pair of connecting holes 36 are formed in the tube-like connecting component 22 to pass therethrough in the crossing direction. The attaching holes 35 are located at the attaching end side of the tube-like connecting component 22, and the connecting holes 36 are located at the free end side of the tube-like connecting component 22.

The manipulating member is set up so that the attaching rod 32 is inserted into the attaching holes 35 of the tube-like connecting component 22 and the connecting rod 33 is inserted into the connecting holes 36 of the tube-like connecting component 22. The manipulation rod 34 is parallel to the tube-like connecting component 22 and disposed at the opposite side to the center of the tire T. The manipulation member (32, 33, 34) is movable in the crossing direction of the tube-like connecting component 22. When the manipulation rod 34 is caused to move forward away from the tube-like connecting component 22, the connecting rod 33 is pulled out from the connecting holes 36 while the attaching rod 32 remains inserted in the attaching holes 35. When the manipulation rod 34 is caused to move backward to come close the tube-like connecting component 22, the connecting rod 33 is inserted into the connecting holes 36 to cross the center hole of the tube-like connecting component 22.

The attaching rod 32 is set up so that the end side portion thereof extends from the tube-like connecting component 22 toward the opposite side to the manipulation rod 34 and is inserted into a spiral spring 37, and a spring retainer 38 is in turn attached to the end of the attaching rod 32. The spiral spring 37 is fitted between the tube-like connecting component 22 and the spring retainer 38. The spiral spring 37 constitutes an elastic member that applies a backward movement force to the manipulation member (32, 33, 34).

Figure 7:
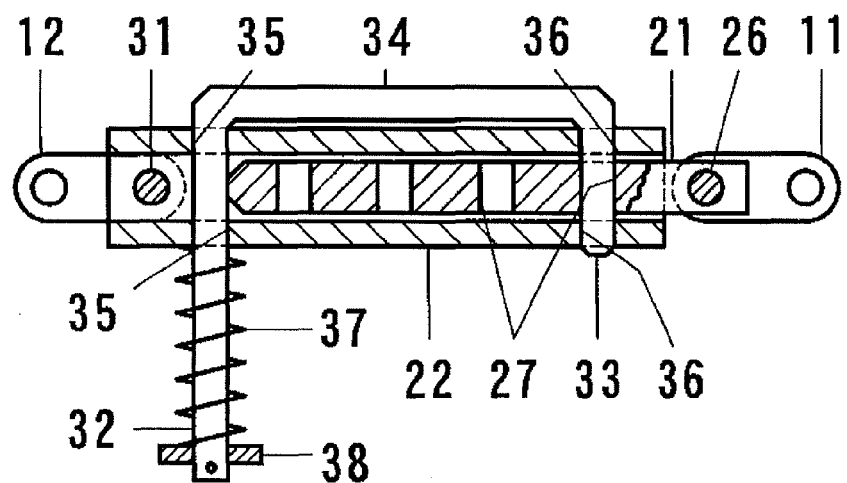
FIG. 7 is a cross-sectional view along line B-B in FIG. 6.
Figure 8:
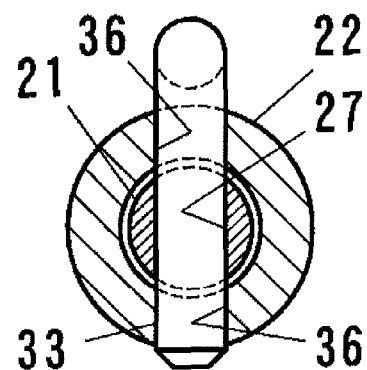
FIG. 8 is an enlarged cross-sectional view along line C-C in FIG. 6.
Figure 9:
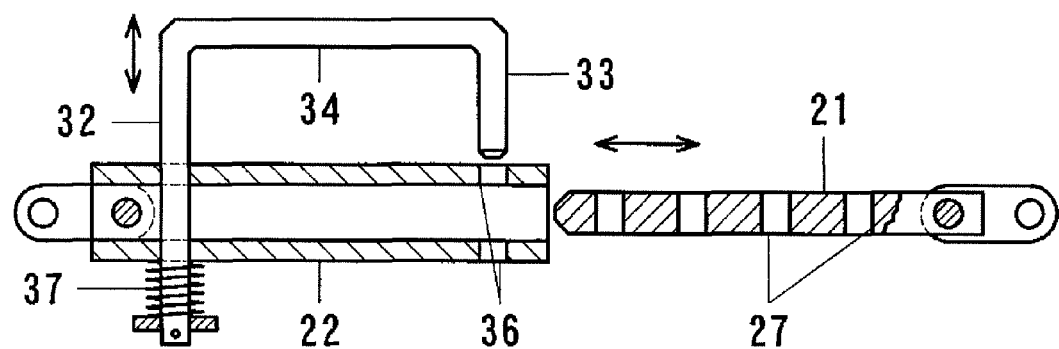
FIG. 9 is a cross-sectional view like FIG. 7 and illustrates a state where a manipulation member of connecting component of the connecting portion is caused to move forward so that a rod-like connecting rod is pulled out from a tube-like connecting component.

When the rod-like connecting component 21 and the tube-like connecting component 22 are connected with each other, the manipulation member (32, 33, 34) is caused to move forward against the spiral spring 37 as the elastic member. The connecting rod 33 is evacuated from the center hole of the tube-like connecting component 22, as shown in FIG. 9. In the evacuated state of the connecting rod 33, the rod-like connecting component 21 is inserted into the center hole of the tube-like connecting component 22. The manipulation member is then caused to move backward by the elastic force of the elastic member 37. As shown in FIG. 7 and FIG. 8, the connecting rod 33 is inserted into the connecting holes 36 of the tube-like connecting component and one of the connecting holes 27 of the rod-like connecting component. The connecting hole 27 to be inserted therein with the connecting rod 33 is chosen when the connecting rod 33 is inserted into one of the connecting holes 27 of the rod-like connecting component. The connecting length of the rod-like connecting component 21 and the tube-like connecting component 22 is adjusted depending on the outer diameter or the outer circumferential length of the tire T.

When the rod-like connecting component 21 and the tube-like connecting component 22 are disconnected from each other, the manipulation member (32, 33, 34) is caused to move forward against the elastic member 37. The connecting rod 33 is pulled out from the connecting holes 36 of the tube-like connecting component and the connecting hole 27 of the rod-like connecting component. The rod-like connecting component 21 is then pulled out from the tube-like connecting component 22, as shown in FIG. 9.

Second Example

Figure 10:
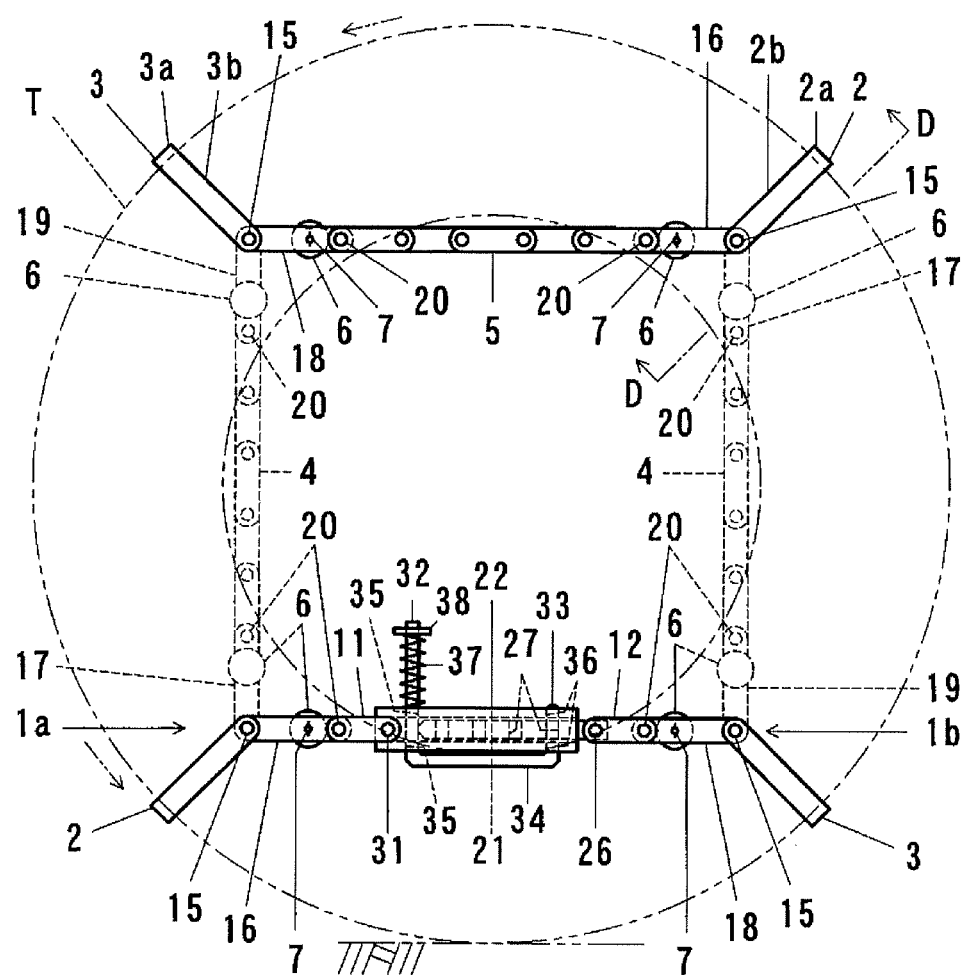
FIG. 10 is a front elevational view of a state where an anti-skid device for tires in a second example according to the embodiments is attached to a tire.
Figure 11:
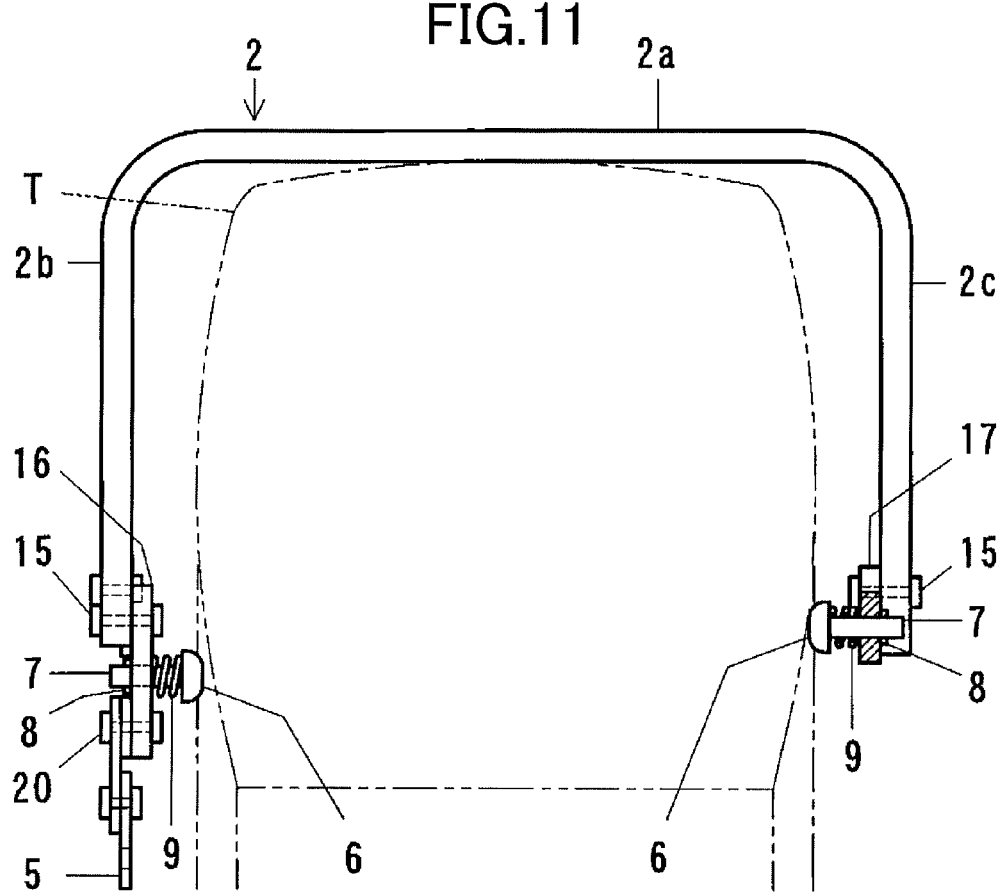
FIG. 11 is an enlarged cross-sectional view along line D-D in FIG. 10.

Refer to FIG. 10 and FIG. 11

An anti-skid device for tires according to the present example comprises two anti-skid bodies 1, i.e. a first anti-skid body 1a and a second anti-skid body 1b, as shown in FIG. 10 and FIG. 11. The two anti-skid bodies 1a and 1b are connected with each other in a belt-like fashion. The anti-skid bodies 1a and 1b are modified in regard to the structure of front-side U-shaped members 2 and rear-side U-shaped members 3. The attaching structure for contact members 6 is also modified.

The front-side U-shaped members 2 and the rear-side U-shaped members 3 are each configured such that a belt-like square bar is curved into a U-shape. Exterior part 2b of each front-side U-shaped member 2 is attached thereto with a front-side extending member 16 by a pin 15 rather than being formed with the front-side extending portion in the first example. Interior part 2c is attached thereto with a rear-side extending member 17 by a pin 15 rather than being formed with the rear-side extending portion in the first example. The front-side extending member 16 and the rear-side extending member 17 are pivotally movable around respective shafts 15 along the axial direction of the tire T.

Exterior part 3b of the rear-side U-shaped member 3 is attached thereto with a rear-side extending member 18 by a pin 15 rather than being formed with the rear-side extending portion in the first example. Interior part 3c is attached thereto with a front-side extending member 19 by a pin 15 rather than being foamed with the front-side extending portion in the first example. The rear-side extending member 18 and the front-side extending member 19 are pivotally movable around respective shafts 15 along the axial direction of the tire T.

Interior-side linear-shaped member 4 like in the first example is suspended between the rear-side extending member 17 and the front-side extending member 19 so that the leading end and the trailing end thereof are attached using respective pins 20. The pin 20 penetrates the leading end or the trailing end of the interior-side linear-shaped member 4 and the rear-side extending member 17 or the front-side extending member 19 in the axial direction of the tire T. Linear-shaped connecting member 5 is suspended between the rear-side extending member 18 of the first anti-skid body 1a and the front-side extending member 16 of the second anti-skid body 1b so that the leading end and the trailing end thereof are attached using respective pins 20. The pin 20 penetrates the leading end or the trailing end of the connecting member 5 and the rear-side extending member 18 of the first anti-skid body 1a or the front-side extending member 16 of the second anti-skid body 1b in the axial direction of the tire T. The connecting member 5 is provided as a chain like the linear-shaped member 4, such as leaf chain. The first anti-skid body 1a and the second anti-skid body 1b are connected with each other in a belt-like fashion.

Front-side connecting member 11 is attached to the leading end of the front-side extending member 16 of the first anti-skid body 1a using a pin 20. The pin 20 penetrates the front-side connecting member 11 and the front-side extending member 16 of the first anti-skid body 1a in the axial direction of the tire T. The front-side connecting member 11 is attached thereto with a tube-like connecting component 22 like in the first example. Rear-side connecting member 12 is attached to the trailing end of the rear-side extending member 18 of the second anti-skid body 1b using a pin 20. The pin 20 penetrates the rear-side connecting member 12 and the rear-side extending member 18 of the second anti-skid body 1b in the axial direction of the tire T. The rear-side connecting member 12 is attached thereto with a rod-like connecting component 21 like in the first example.

The front-side extending member 16 and the rear-side extending member 18 are provided with respective exterior-side contact members 6 that contact with the outside surface of the tire T. The rear-side extending member 17 and the front-side extending member 19 are provided with respective interior-side contact members 6 that contact with the inside surface of the tire T. The exterior-side and the interior-side contact members 6 have the same attaching structure. The structure in which the exterior-side contact member 6 is attached to the front-side extending member 16 will be described with reference to FIG. 11. The structure in which the interior-side contact member 6 is attached to the rear-side extending member 17 will also be described.

Shaft 7 penetrates the front-side extending member 16 along the width direction of the anti-skid body 1, i.e. the axial direction of the tire T. The shaft 7 is made capable of moving forward and backward in the axial direction of the tire T. The inner end of the shaft 7 protrudes into the anti-skid body 1 and is fixed thereto with a disc-shaped contact member 6. The outer end of the shaft 7 protrudes from the anti-skid body 1 and is attached therethrough with a split pin 8 as a retainer. The inner end side portion of the shaft 7 is inserted into a cylindrical-shaped spiral spring 9. The spiral spring 9 is fitted between the contact member 6 and the front-side extending member 16. This spiral spring 9 constitutes an elastic member that applies a forward movement force to the shaft 7 attached thereto with the contact member 6. The exterior-side contact member 6 is configured to contact with the outside surface of the tire T by the elastic force of the elastic member 9. In addition, another shaft 7 penetrates the rear-side extending member 17 along the axial direction of the tire T. The shaft 7 is made capable of moving forward and backward in the axial direction of the tire T. The inner end of the shaft 7 protrudes into the anti-skid body 1 and is fixed thereto with a disc-shaped contact member 6. The outer end of the shaft 7 protrudes from the anti-skid body 1 and is attached therethrough with a split pin 8 as a retainer. The inner end side portion of the shaft 7 is inserted into a cylindrical-shaped spiral spring 9. The spiral spring 9 is fitted between the contact member 6 and the rear-side extending member 17. This spiral spring 9 constitutes an elastic member that applies a forward movement force to the shaft 7 attached thereto with the contact member 6. The interior-side contact member 6 is configured to contact with the inside surface of the tire T by the elastic force of the elastic member 9. The shafts 7 are dedicated to the contact members 6. The front-side extending member 16 and the rear-side extending member 17 serve as attaching members for the contact members.

When the anti-skid device for tires according to the present example is attached to the tire T, the belt-like first anti-skid body 1a and second anti-skid body 1b are engaged and laid on the upper portion of the tire T. The rear portion of the first anti-skid body 1a is fitted therein with the upper left portion of the tire T while suspending the front portion around the lower left of the tire T. The front portion of the second anti-skid body 1b is fitted therein with the upper right portion of the tire T while suspending the rear portion around the lower right of the tire T. The front-side tube-like connecting component 22 of the first anti-skid body 1a and the rear-side rod-like connecting component 21 of the second anti-skid body 1b are connected with each other. When being detached from the tire T, the rod-like connecting component 21 and the tube-like connecting component 22 are disconnected from each other.

Other features are the same as those in the first example. Like parts in the drawings are denoted by the same reference numerals or characters as those in the first example.

Figure 12:
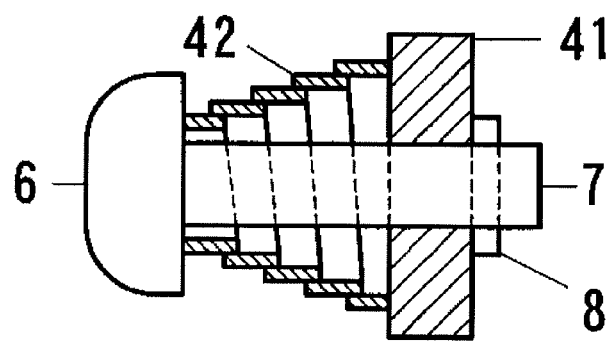
FIG. 12 is an enlarged cross-sectional view of a contact member and relevant parts of an anti-skid device in a third example according to the embodiments.

Third example (refer to FIG. 12 and FIG. 13) The anti-skid device for tires according to the present example is such that, as shown in FIG. 12, each elastic member for applying a forward movement force to the shaft 7 attached thereto with the contact member 6 in the first or second example is substituted by a circular truncated cone tubular-shaped spiral spring, such as volute spring 42, rather than being the cylindrical-shaped spiral spring 9.

The shaft 7 penetrates an attaching member 41 for the contact member of the anti-skid body along the width direction of the anti-skid body, i.e. the axial direction of the tire T. The shaft 7 is made capable of moving forward and backward in the axial direction of the tire T. The inner end of the shaft 7 is fixed thereto with a disc-shaped contact member 6. The outer end of the shaft 7 is attached therethrough with a split pin 8 as a retainer. The inner end side portion of the shaft 7 is inserted into the volute spring 42. The volute spring 42 is fitted between the contact member 6 and the attaching member 41 for the contact member.

Figure 13:
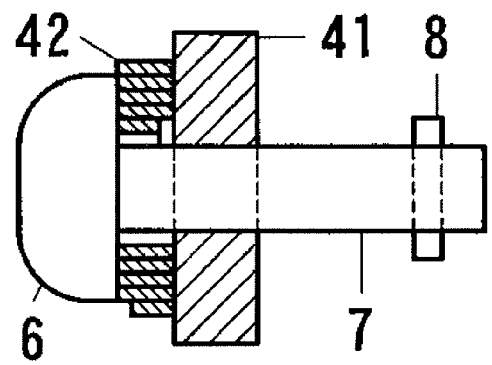
FIG. 13 is a cross-sectional view like FIG. 12 and illustrates a state where the contact member moves backward.

When maximally contracted, the volute spring 42 is in volute shape as shown in FIG. 13, so that the minimum length becomes short. The distance where the contact member 6 can move forward and backward thus becomes long. The adjustment range for the inner width of the anti-skid body is also extended.

Other features are similar to those in the first or second example.

Fourth Example

Figure 14:
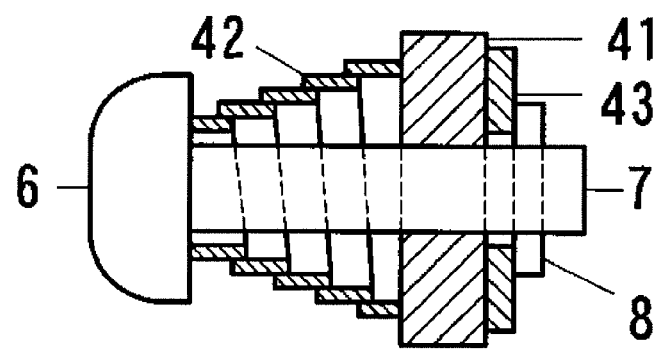
FIG. 14 is an enlarged cross-sectional view of a contact member and relevant parts of an anti-skid device in a fourth example according to the embodiments.
Figure 15:
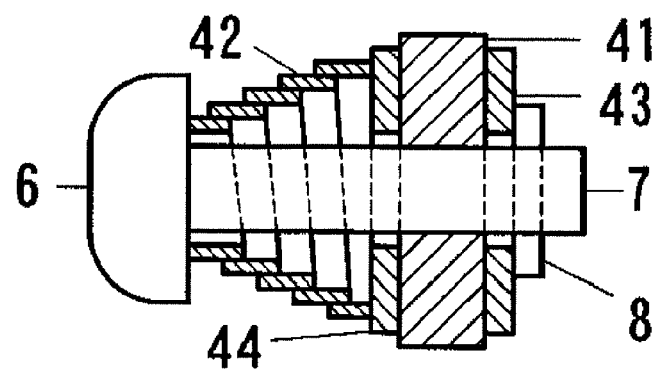
FIG. 15 is a cross-sectional view like FIG. 14 and illustrates a state where an adjustment plate is added to the contact member and relevant parts.

Refer to FIG. 14 and FIG. 15

The anti-skid device for tires according to the present example is such that, as shown in FIG. 14 and FIG. 15, adjustment plates 43 and 44 are added to the attaching structure for the contact member 6 in the third example.

The attaching structure for the contact member 6 which is similar to that in the third example is such that a split pin 8 as a retainer can be attached to and detached from the shaft 7. As shown in FIG. 14, the outer end side portion of the shaft 7 is inserted into a circular ring plate-shaped adjustment plate 43. The adjustment plate 43 is fitted between an attaching member 41 for the contact member and the split pin 8. In this example, the adjustment plate 43 is a washer.

The outer adjustment plate 43 is attached in such a manner thereby causing the contact member 6 to protrude into the anti-skid body with less protruding length. In addition, the elastic force of the elastic member 42 is also enhanced. If, in contrast, the outer adjustment plate 43 is detached, then the protruding length into the anti-skid body increases. In this case, the elastic force of the elastic member 42 is reduced.

Further in the example shown in FIG. 15, the inner end side portion of the shaft 7 is inserted into a circular ring plate-shaped adjustment plate 44. The adjustment plate 44 is fitted between the attaching member 41 for the contact member and the elastic member 42. In this example, the adjustment plate 44 is a washer.

The inner adjustment plate 44 is attached in such a manner thereby to enhance the elastic force of the elastic member 42 regardless of being with a constant protruding length of the contact member 6 into the anti-skid body. If, in contrast, the inner adjustment plate 44 is detached, then the elastic force of the elastic member 42 is reduced regardless of being with a constant protruding length into the anti-skid body.

The elastic force of the elastic member 42 and the protruding length of the contact member 6 can be adjusted by whether the outer adjustment plate 43 and/or the inner adjustment plate 44 are attached or detached or by the number of the outer adjustment plate 43 and the inner adjustment plate 44, each of which may comprises one or more plates. Alternatively or in addition, one or more inside adjustment plates 44 may be fitted between the elastic member 42 and the contact member 6 thereby providing a similar effect.

Other features are the same as those in the third example. Like parts in the drawings are denoted by the same reference numerals as those in the third example.

Examples in Modification

1. In the above embodiments, both the exterior-side and the interior-side contact members 6 are movable in response to the movement of the outside surface or the inside surface of the tire T, but either one of the exterior-side or the interior-side contact member 6 may be solely movable.

2. In the above embodiments, the attaching structure for the contact member 6 is such that the cylindrical-shaped spiral spring 9 or the circular truncated cone tubular-shaped spiral spring 42 is used as the elastic member for applying the forward movement force to the shaft 7 attached thereto with the contact member, but other elastic members may also be used.

3. In the forth example of the above embodiments, the outer and the inner adjustment plates 43 and 44 are formed into circular ring plate shapes, but may also be formed into other shapes, such as horseshoe shape.

4. In the above embodiments, the attaching structure for the contact member 6 is such that the split pin 8 is used as a retainer for retaining the shaft 7, but other retaining means may also be used, such as locknut and retaining ring.

5. In the above embodiments, the attaching member for the contact member is the U-shaped member 2 or 3 in the first example and is one of the members 16 to 19 and 41 attached to the U-shaped member 2 or 3 in the second example, but may also be the interior-side linear-shaped member 4, the front-side connecting member 11, the rear-side connecting member 12, or the linear-shaped connecting member 5.

6. In the above embodiments, the anti-skid body 1 is such that the interior-side linear-shaped member 4 and the linear-shaped connecting member 5 are each made as a chain, but each may also be made as a wire rope or a steel wire.

7. In the above embodiments, the anti-skid body 1 comprises three or two bodies, but may also comprise four or more bodies.

INDUSTRIAL APPLICABILITY

The anti-skid device for tires according to the present invention can be applied to the usage for various cars, such as small size, middle size, or large size passenger cars or motor trucks.

The invention claimed is:

1. An anti-skid device for a tire of a car, the anti-skid device comprising:
at least two or more anti-skid bodies having a U-shaped cross-section, the anti-skid bodies being fitted on the tire and arranged in a circumferential direction of the tire such that the anti-skid bodies are connected with one another, the anti-skid bodies having an exterior part and an interior part, the exterior part being provided with a contact member for contacting with an outside surface of the tire, the interior part being provided with a contact member for contacting with an inside surface of the tire that faces axially inwardly towards the car, wherein
the exterior part or the interior part of the anti-skid bodies is attached to the contact member with a shaft along an axial direction of the tire so that the shaft can move forward and backward in the axial direction of the tire, the contact member is disposed at an inner end of the shaft that protrudes into the anti-skid bodies, an elastic member is provided to apply a forward movement force to the shaft attached to the contact member, the contact member is pressed against the outside surface or the inside surface of the tire by an elastic force of the elastic member such that: (1) the contact member moves forward by the elastic force of the elastic member in response to a movement of the outside surface or the inside surface of the tire in contact with the contact member to an opposite side of the contact member, and (2) the contact member moves backward against the elastic force of the elastic member in response to a movement of the outside surface or the inside surface of the tire in contact with the contact member to a side of the contact member.

2. The anti-skid device for tires as set forth in claim 1, wherein the elastic member is a spiral spring in which an inner end side portion of the shaft is inserted and which is fitted between the contact member and the exterior part or the interior part of the anti-skid bodies.

3. The anti-skid device for tires as set forth in claim 2, wherein the spiral spring is a volute spring which is in volute shape when maximally contracted.

4. The anti-skid device for tires as set forth in claim 2, wherein an outer end of the shaft protruding from the anti-skid bodies is provided with a retainer, an outer end side portion of the shaft is inserted into an outer adjustment plate, and the outer adjustment plate is fitted between the retainer and the exterior part or the interior part of the anti-skid bodies.

5. The anti-skid device for tires as set forth in claim 2, wherein the inner end side portion of the shaft is inserted into an inner adjustment plate, and the inner adjustment plate and the spiral spring are fitted between the contact member and the exterior part or the interior part of the anti-skid bodies.

* * * * *